United States Patent [19]
Will

[11] Patent Number: 5,832,778
[45] Date of Patent: Nov. 10, 1998

[54] DRIVE SYSTEM FOR MOTORIZED MACHINES

[76] Inventor: Dale D. Will, 10750 May Rd., Wattsburg, Pa. 16442

[21] Appl. No.: 788,659

[22] Filed: Jan. 24, 1997

[51] Int. Cl.$^6$ ............................................. F16H 35/18
[52] U.S. Cl. .................................... 74/391; 74/665 K
[58] Field of Search ...................... 74/391, 607, 665 K; 180/190, 376

[56] References Cited

U.S. PATENT DOCUMENTS

| | | | |
|---|---|---|---|
| 2,998,735 | 9/1961 | Elfes | 74/391 X |
| 3,452,612 | 7/1969 | Casey | 74/391 |
| 4,146,101 | 3/1979 | Plourde . | |
| 4,158,971 | 6/1979 | Szalai et al. | 74/391 X |
| 4,186,626 | 2/1980 | Chamberlain | 74/391 X |
| 4,301,884 | 11/1981 | Taylor . | |
| 4,391,351 | 7/1983 | Jirousek et al. | 74/391 X |
| 4,461,373 | 7/1984 | Pratt et al. | 74/391 X |
| 4,560,018 | 12/1985 | Satzler | 74/391 X |
| 4,714,130 | 12/1987 | Ujita et al. | 74/391 X |
| 5,014,805 | 5/1991 | Uchida . | |
| 5,060,745 | 10/1991 | Yasui et al. . | |

*Primary Examiner*—Charles A. Marmor
*Assistant Examiner*—Mary Ann Battista

[57] ABSTRACT

A drive system includes a hollow axle with a jackshaft that extends therethrough and is mounted to extend parallel thereto. Bearings rotatably connect both the hollow axle and the jackshaft to first and second chassis portions. A first end of the jackshaft extends beyond the hollow axle and is connected to a motor by a pair of clutches interconnected by a drive belt. A second end of the jackshaft extends beyond the opposite end of the axle and has a drive sprocket attached thereto that is interconnected to a first idler sprocket on an idler shaft by a first drive chain. A second idler sprocket is connected to a driven sprocket, which is affixed to the axle, by a second inboard drive chain.

8 Claims, 4 Drawing Sheets

DRIVE SYSTEM FOR MOTORIZED MACHINES

BACKGROUND

1. Field of Invention

This invention relates to a drive system, and more specifically to an improved jackshaft, axle, brake system and interconnecting drive means with speed to power ratio arrangement for motorized machines.

2. Description of Prior Art

Motorized machines requiring a jackshaft for transmitting power to a drive shaft or an axle, have typically used an arrangement of rotatably mounting the jackshaft at a predetermined location, parallel to the drive shaft or axle. Power is then transmitted from the jackshaft to the axle through an interconnecting drive means, for example, a pair of sprockets and an endless chain, fluid drive, pulleys and a drive belt, or a combination of gears. Accordingly, there have been many problems associated with this type of arrangement. A need is understood to exist for a lightweight, reliable, efficient, tunable and a safer drive system for motorized machines.

Typical prior art drive systems used on a snowmobile, for example are shown in U.S. Pat. Nos. 4,301,884 to Taylor (1981), and 5,033,572 to Zulawski (1991). In existing prior art arrangements a driven clutch, jackshaft, bearings, brake components, interconnecting drive means and all related mounting brackets and hardware are located high on a chassis, causing a very high center of gravity. This results in a poor handling, unsafe machine with undesirable performance characteristics. In addition the prior art has not provided a safe reliable braking system, due in part to locating a brake rotor or a drum on the jackshaft, instead of directly on the axle. Therefore upon deceleration of the machine all the force required to slow or stop the machine must be first transferred through the shafts and interconnecting drive means.

Maximum performance and reliability is not possible if parallelism is not maintained within all revolving, interconnected components of a power unit and the entire drive system. Prior art requires mounting brackets and bearing retainers, made up of stamped metal plates attached to the chassis with rivets, bolts, or welding. Such arrangements, however, do have high weight and the cost of stamping and attaching the plates can add significantly to the overall cost of the machine. As these components and the chassis become worn and stressed from use, proper alignment of the power unit, clutches, shafts and rotating components cannot be maintained. This creates an inefficient and unreliable drive system subject to wearing and failure of all the related components mentioned above. In an effort to alleviate these problems some manufactures have designed a one piece cast chassis. This adds expense and the chassis is subject to flexing, cracking and breakage, and is very difficult to re-align once the foregoing has accrued.

Previously proposed drive systems have employed an interconnecting drive means with a single speed-to-power ratio reduction. The desired amount of ratio reduction is accomplished by attaching sprockets, gears or pulleys with a different number of teeth to the jackshaft and to the axle. For example, a typical prior art drive system requires a twenty one tooth sprocket on the jackshaft and a thirty three tooth sprocket on the axle to achieve a final ratio of 0.636. The closest available ratio if lower gearing is desired would require a twenty one tooth sprocket on the jackshaft and a thirty four tooth sprocket on the axle resulting in a 0.617 ratio. On the other hand if a higher ratio is desired, a twenty two tooth sprocket on the jackshaft and a thirty four tooth sprocket on the axle would result in a final ratio of 0.647. Therefore, optimum gearing for maximum performance and efficiency can not be achieved because only a limited number of ratios are available and slight changes in ratios is generally not possible with this type of arrangement.

Due to the placement of the jackshaft in relationship to the axle, the distance between the interconnecting drive means is relatively large, thus requiring a lengthy drive chain, gear train or belt, and a housing to support a bearing and to protect the interconnecting drive means. This arrangement creates an undesirable amount of flexing and twisting of these components, resulting in part failure and poor efficiency.

Yet another disadvantage with locating the jackshaft and related components high on the chassis, nearby the power unit, is the space required to do so, thus making it difficult to repair and service the machine, while consuming valuable space that could otherwise be utilized to attach other components lower on the chassis, to further enhance the ergonomics of the entire vehicle.

In addition, this is an undesirable area for a brake mechanism and related components to be located, due to the heat emitted from the power unit, thus affecting the stopping ability, reliability and safety of the machine. At least one manufacturer has recognized this problem by utilizing a liquid cooled brake caliper. This setup adds weight and expense, and is subject to leaks and part failure.

Furthermore when locating the jackshaft and driven clutch on a plane higher than the output shaft of the power unit, as in prior art, the force upon acceleration of the machine causes the power unit to "lift" in the chassis. This condition causes premature failure of the power unit mounts, the drive clutch, and misalignment of the driven clutch and drive belt, further reducing efficiency and reliability of the entire drive system.

All of the disadvantages mentioned in the foregoing description of prior art, are greatly increased and become more frequent, when horsepower, revolutions per minute and cubic displacement of the power unit is increased, or the machine is subject to extreme conditions such as racing. In an effort to satisfy customer demands and be more competitive in all forms of racing, the manufactures of all types of recreational vehicles and farm equipment are presently producing faster, more powerful machines then in the past.

In view of the foregoing, there is a need for an improved drive system for motorized machines, thus overcoming the disadvantages mentioned above, currently being manufactured using prior art arrangements.

OBJECTS AND ADVANTAGES

The constant ratio transmission currently being used in snowmobiles and all terrain vehicles, as shown for example in U.S. Pat. Nos. 5,014,805 to Uchida (1991) and 4,917,207 to Yasui (1990) are considered to be a very efficient, economical means of transmitting power. Therefore the use of this type of transmission has been applied to, for example, automobiles, farm equipment, four wheel off road vehicles, go-carts, and motor scooters. As the demand for the application of this transmission increases, so will the demand for my invention, which performs well in conjunction with this type of arrangement. Several objects and advantages of the present invention are:

(a) to provide a drive system with such an arrangement as to create a low center of gravity to enhance the traveling performance, ergonomics and safety of the whole vehicle;

(b) to provide a drive system which will utilize a safe, predictable, and reliable braking system for slowing and stopping the vehicle;

(c) to provide a drive system which will maintain parallelism between all rotating components of the jackshaft, axle, interconnecting drive means, drive and driven clutches, and the power unit to increase performance and reliability of the machine;

(d) to provide a drive system which will increase the overall strength and rigidity of the chassis while keeping manufacturing costs at a minimum;

(e) to provide a drive system which will allow for a very broad range of speed-to-power ratios available to enhance the performance of the machine;

(f) to provide a drive system which will locate the entire drive system, brake mechanism and related components away from the power unit and related components, therefore making the machine easier to repair and service, while allowing space for other components to be attached at a lower position on the chassis;

(g) to provide a drive system and brakes that will operate at a cool temperature, thus improving efficiency and reliability;

(h) to provide a drive system which will reduce premature failure of the power unit mounts, drive belt, drive and driven clutches, and related components;

(i) to provide a drive system which will provide a relatively short centerline distance between the interconnecting drive means, thus creating a very rigid, efficient and reliable housing arrangement which would be ideally suited for a gear train, endless flexible drive or fluid drive; and (j) to provide a drive system which is employed as a structural member of the chassis while adding strength and rigidity to the entire machine.

The forgoing and other objects, features and advantages of the present invention will become more apparent from the following detailed description which proceeds with reference to the accompanying drawings.

BRIEF DESCRIPTION OF THE DRAWINGS

An improved drive system for motorized vehicles and equipment constructed in accordance with this invention is described hereinbelow with reference to the accompanying drawings, wherein.

DETAILED DESCRIPTION OF THE PREFERRED EMBODIMENT OF THE INVENTION

Figure 1:
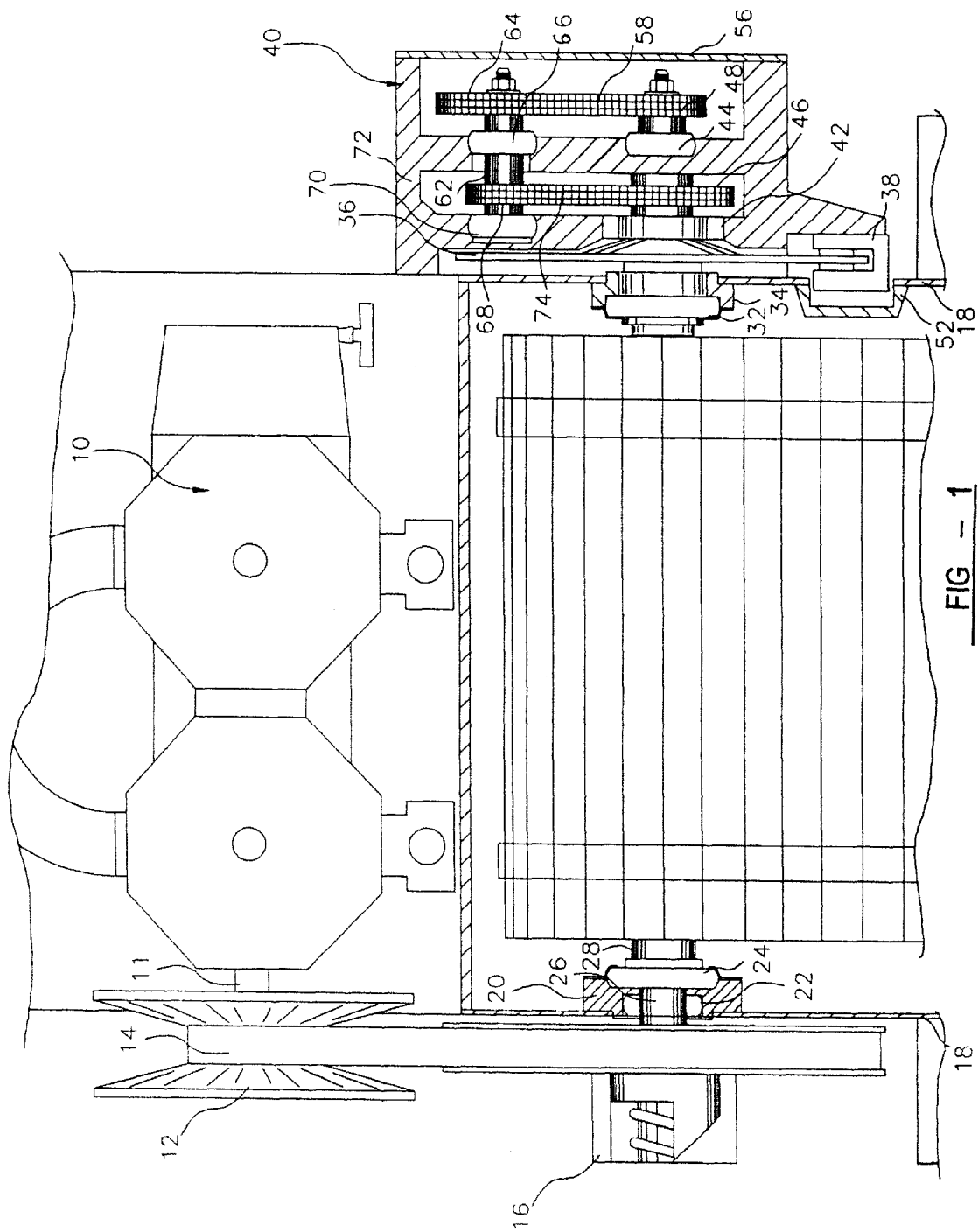
FIG. 1 is a top plan view showing the power unit assembly arrangement with the interconnecting drive means assembly rotated 90 degrees for clear viewing with a portion of the chassis and other components shown in section along the line 1—1 in FIG. 3.
Figure 3:
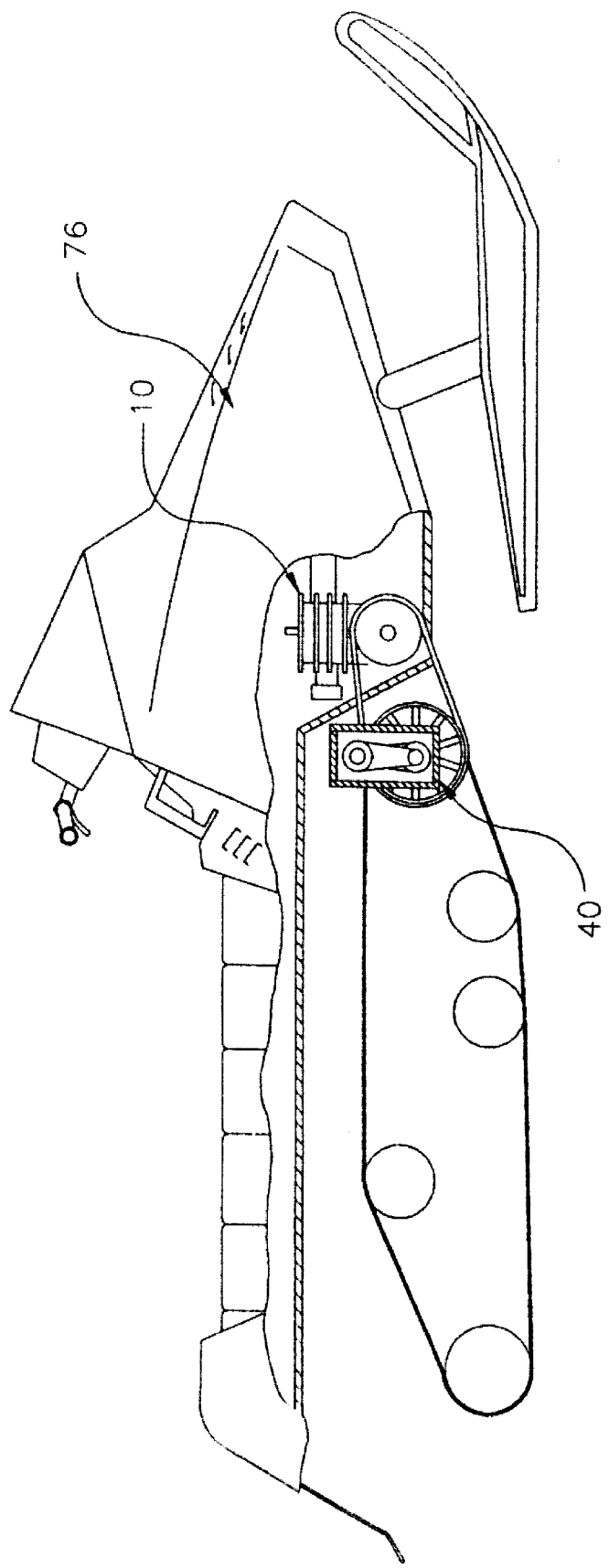
FIG. 3 is a side view of a snowmobile with portions broken away and portions shown in section, showing the arrangement of the drive system.
Figure 4:
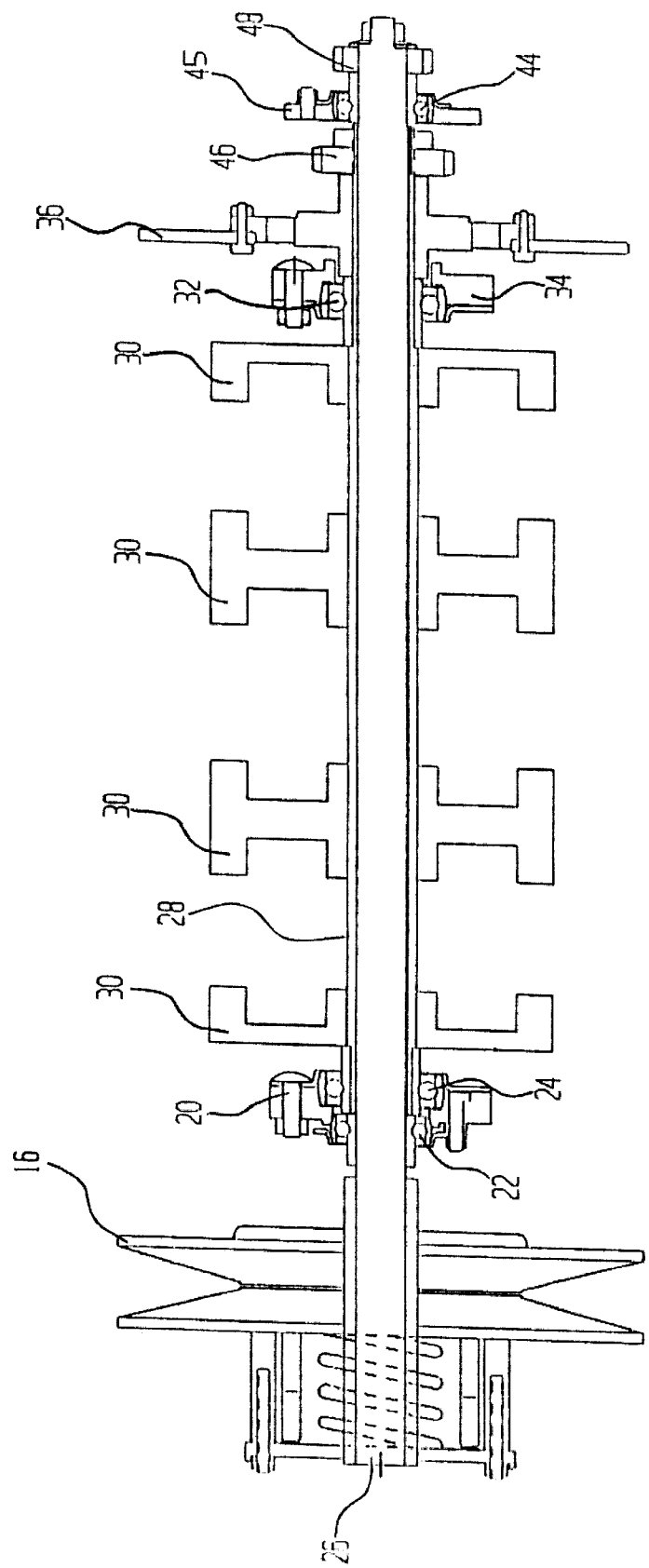
FIG. 4 is a sectional layout view of the drive system with section lines and the interconnecting drive means eliminated for clear viewing.

Referring now to FIG. 1, a power unit assembly 10, is typically attached to a chassis 18, of a motorized machine 76, (FIG. 3). The construction of the power unit assembly 10, may be of any known type, however the power unit assembly 10, drives an output shaft 11, that rotates about an axis that is parallel to the axis of a jackshaft 26, and an axle 28. The output shaft 11, drives a drive clutch 12, which in turn drives a driven clutch 16, through a drive belt 14.

The driven clutch 16, is in turn coupled in an appropriate manner to the jackshaft 26. The jackshaft 26, and the axle 28, are rotatably supported, parallel to one another, at a first end with a dual bearing retainer 20. The dual bearing retainer 20, is rigidly affixed in a suitable manner to the chassis 18.

A first end jackshaft bearing 22, is contained within the dual bearing retainer 20, allowing the jackshaft 26, to pass entirely through the first end jackshaft bearing 22, the dual bearing retainer 20, and the chassis 18, thus allowing the driven clutch 16, to be coupled to the jackshaft 26.

A first end axle bearing 24, is contained within the dual bearing retainer 20, providing rotational support for the axle 28, which ends within the dual bearing retainer 20, at the outermost surface of the first end axle bearing 24. It should be appreciated that the dual bearing retainer 20, maintains parallelism of the first end jackshaft bearing 22, and the first end axle bearing 24, therefore maintaining a precise alignment of the jackshaft 26, and the axle 28, while assuring the proper alignment of the first end of the drive system to the chassis 18.

The axle 28, is hollowed out internally large enough to allow the jackshaft 26, to pass through and rotate freely and independently of the axle 28. The axle 28, is rotatably attached to the chassis 18, at a second end and supported by a second end axle bearing 32, which is contained within a single bearing retainer 34. The single bearing retainer 34, is rigidly attached to the chassis 18, and allows the axle 28, to pass entirely through a bore in the chassis 18. A brake rotor 36, and an axle sprocket 46, are coupled to the axle 28, in an appropriate manner.

Figure 2:
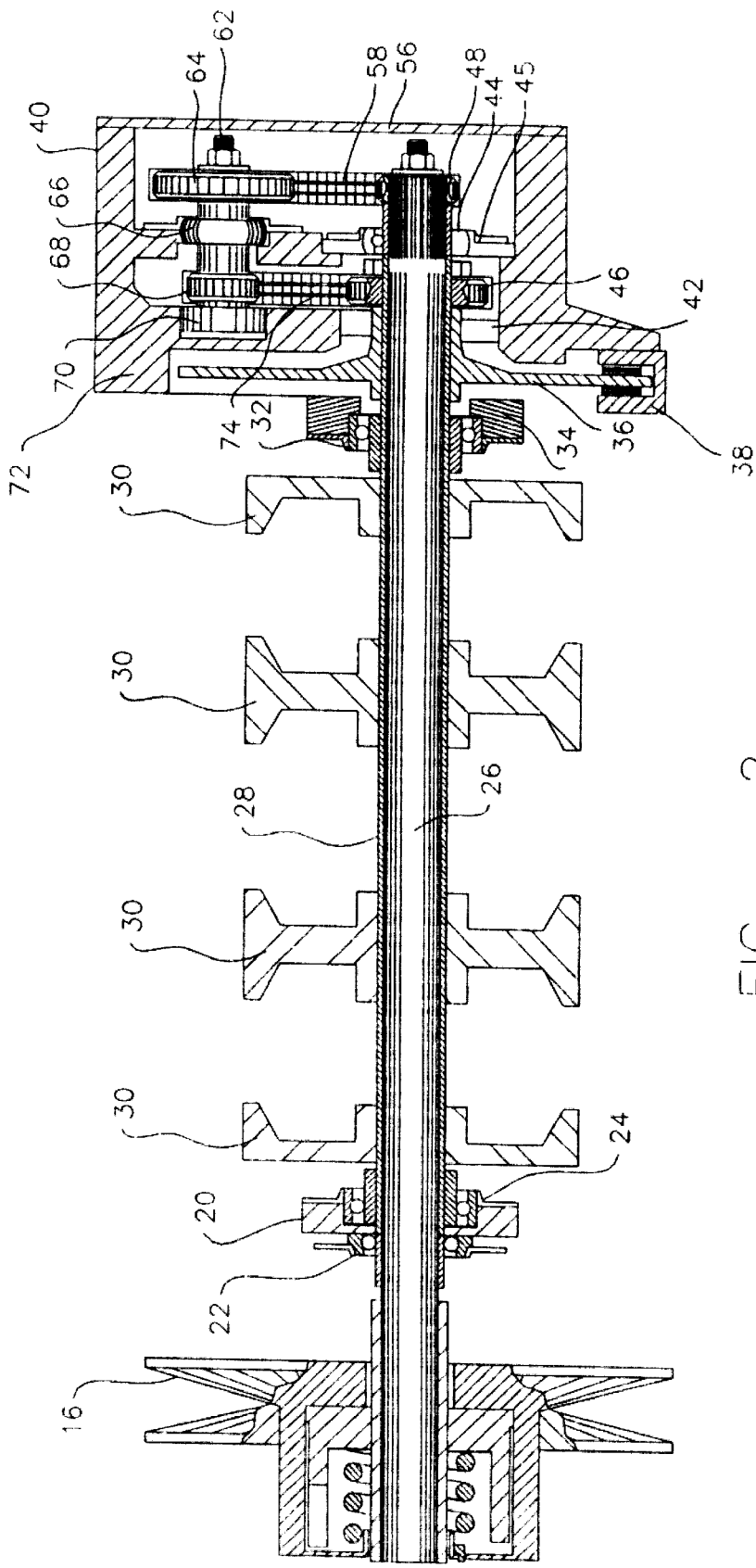
FIG. 2 is a layout view of the complete drive system with portions shown in section along the line 2—2 in FIG. 3.

Referring now to FIG. 2, the jackshaft 26, is rotatably supported by a second end jackshaft bearing 44, and contained within a jackshaft bearing retainer 45, which is rigidly affixed in a suitable manner within a bore formed in a housing 72. The housing 72, is rigidly attached to the chassis 18, in a suitable manner. It should be appreciated that this arrangement will ensure a rigid support, parallelism, and precise alignment of the jackshaft 26, and the axle 28, at the second end of the drive system.

The jackshaft 26, passes entirely through the second end of the axle 28, and the second end jackshaft bearing 44, therefore allowing a jackshaft sprocket 48, to be coupled to the jackshaft 26, in an appropriate manner.

The jackshaft sprocket 48, is interconnected by an outside drive chain 58, to a jackshaft idler sprocket 64, within the housing 72. The jackshaft idler sprocket 64, is coupled to an idler shaft 62, in an appropriate manner.

The idler shaft 62, is rotatably supported within the housing 72, by a center idler bearing 66, and an inner idler bearing 70, both of which are rigidly affixed in a suitable manner within bores formed in the housing 72. An axle idler sprocket 68, is coupled to the idler shaft 62, in an appropriate manner.

The axle idler sprocket 68, is interconnected by an inside drive chain 74, which in turn drives the axle sprocket 46, which drives the axle 28, at the desired final ratio.

Final drive wheels 30, are coupled to the axle 28, in a suitable manner and provide a desired means of propelling or driving the motorized machine 76.

A housing cover 56, is attached to the housing 72, in an appropriate manner to protect the internal components of the interconnecting drive means assembly 40, from foreign matter.

An axle seal 42, is affixed in a suitable manner to form a leakproof seal within a bore formed in the housing 72, and a diameter formed on the outermost surface of the brake rotor 36.

Referring again to FIG. 1, a brake caliper 38, is rigidly attached to the housing 72. A caliper cover 52, is attached in a suitable manner to the chassis 18, and provides a leakproof seal to protect braking components from foreign matter.

SUMMARY, RAMIFICATIONS, AND SCOPE

The present invention is a drive system for motorized machines in which the jackshaft 26 rotates internally within the axle 28, and in turn drives the axle at a desired speed-to-power ratio.

To accomplish the above objective, according to a first aspect of the present invention, there is provided hollow axle 28 which allows jackshaft 26 to pass through the axle. A unique dual bearing retainer 20 is required to support the jackshaft 26 and the axle 28 at one side of the chassis 18, thus allowing a first end of the jackshaft 26 to extend entirely through the dual bearing retainer 20, while supporting the axle tube 28 which ends at the dual bearing retainer 20.

With such an arrangement, the gravity center of the entire vehicle can be set at a lower point to enhance the traveling performance, ergonomics and safety. This arrangement also results in a very reliable and efficient drive system, subject to minimal misalignment and flexing problems. The aforedescribed results are achieved due to the fact that the rotating components are securely locked in position, parallel to one another, and employed as a structural member of the machine.

According to another aspect of the invention, the interconnecting drive means 40 located at a second end of the drive system, employs a unique arrangement in which the jackshaft 26 extends through the axle 28 to an outer drive means, for example sprockets 48, 64 and endless chain 58 arrangement. This outer drive means drives an idler shaft 62, which in turn drives an inner drive means 46, 68, 74, which in turn drives the axle 28. This double reduction arrangement permits a wide variety of available speed-to-power ratios allowing the use of precise final ratios for maximum performance and efficiency. This arrangement also results in a relatively short centerline distance between the interconnecting drive means thereby creating a desirable arrangement for a fluid drive, flexible endless drive or a gear drive to be employed. This embodiment will also insure the proper alignment of the rotating components while reducing undesirable twisting and flexing of the housing.

In addition, according to another aspect of the present invention, there is provided a very safe and predictable means of slowing and stopping the machine. The foregoing is accomplished by locating a brake rotor or a drum 36 directly on the axle 28, resulting in a very positive and fast deceleration response. In the event of a failure of the interconnecting drive means 40, the brakes 36 would remain fully operational, and during normal operation the forces exerted when applying the brakes 36 are not transmitted through the interconnecting drive means which would otherwise induce stress and wear upon these components, and create an undesirable amount of "lag" time in the braking response.

Furthermore, by locating these components in this location far less radiant heat emitted from the exhaust muffler and power unit 10 will be transmitted to the entire drive system and braking components so that inconveniences due to the heating of these components will not occur.

In accordance with the aforementioned embodiment of the invention, the entire drive system and brake components are positioned at a location a distance away from the power unit and other necessary machine components. This arrangement enables easy access in the event of repairing or servicing the machine, and provides valuable space for positioning other components at a lower point to further enhance the traveling performance of the machine.

This arrangement also enables the jackshaft and the driven clutch to be positioned on a lower plane than the power unit and the drive clutch, therefore creating a desirable effect in regards to proper alignment of the clutches, drive belt and the mounts attaching the power unit to the chassis. Therefore, upon acceleration of the machine the forces exerted on the power unit mounts are in a downward direction, thus using the strength of the chassis for maximum support. Minimal movement of the power unit on the chassis is achieved while placing less stress on the power unit mounts, therefore resulting in proper alignment of the drive clutch, drive belt, and the driven clutch while assuring maximum performance and reliability.

This drive system arrangement transmits precise power throughout all of the interrelated components while assuring that no single component is over stressed. These components are less likely to fail and require maintenance when the stress induced upon them is evenly distributed.

The drive system is employed as a structural member of the chassis, therefore adding strength and rigidity to the entire machine, while providing many hours of trouble free operation and requiring very little maintenance.

Although the description above contains many specificities, these should not be construed as limiting the scope of the invention but as merely providing illustrations of some of the presently preferred embodiments of this invention.

Having illustrated and described the principals of my invention by what is presently a preferred embodiment, it should be apparent to persons skilled in the art that the invention may be modified in an arrangement and detail without departing from such principles. As an example, the invention may be applied to all types of motorized vehicles and machines requiring a jackshaft or a driven shaft to transmit power to a driveshaft or an axle. The interconnecting drive means may consist of a chain drive, belt drive, fluid drive, or gear driven unit. I claim as my invention all such modifications as come with the true spirit and scope of the following claims.

What is claimed is:

1. A drive system for a motorized machine, said motorized machine including a motor, said drive system comprising:
   a) a hollow axle extending between first and second chassis portions;
   b) first bearing means mounting each end of said hollow axle in one of said first and second chassis portions;
   c) a jackshaft extending through said hollow axle and extending beyond each end of said hollow axle;
   d) second bearing means mounting each end of said jackshaft in one of said first and second chassis portions;
   e) a driven means attached to a first end of said jackshaft which extends beyond a first end of said axle, said driven means being interconnected to a drive means by first endless flexible drive means;

f) interconnecting drive means attached to a second end of said jackshaft and a second end of said axle opposite said first ends, respectively, said interconnecting drive means including
  i) a drive sprocket affixed to said jackshaft;
  ii) an idler shaft spaced from and parallel to said jackshaft;
  iii) a first idler sprocket affixed to said idler shaft;
  iv) a second endless flexible drive means interconnecting said drive sprocket and said first idler sprocket;
  v) a second idler sprocket mounted on said idler shaft inboard of said first idler sprocket;
  vi) a driven sprocket affixed to said axle;
  vii) a third endless flexible drive means interconnecting said second idler sprocket and said driven sprocket;
whereby drive torque is adapted to be transmitted from the motor to said jackshaft from the drive means to the driven means by said first endless flexible drive means and from said jackshaft to said axle by said drive sprocket through said second endless flexible drive means to said first idler sprocket, from said first idler sprocket to said second idler sprocket through said idler shaft, through said second idler sprocket to said driven sprocket which is affixed to said axle, by said third endless flexible drive means.

2. The drive system of claim 1 wherein said drive means and said driven means comprise first and second clutch means and said first endless flexible drive means comprises a drive belt.

3. The drive system of claim 1 wherein said first and second bearing means maintain said jackshaft and said axle in parallel alignment.

4. The drive system of claim 1 wherein said first bearing means and said second bearing means which engage said first ends of said jackshaft and said axle comprise a dual bearing with a first bearing engaging said axle and a second bearing engaging said jackshaft.

5. The drive system of claim 1 wherein drive wheels are affixed to said axle at points intermediate its ends.

6. The drive system of claim 1 wherein said second endless flexible drive means and said third endless flexible drive means comprise first and second drive chains.

7. The drive system of claim 1 further comprising a brake rotor attached directly to said axle.

8. The drive system of claim 7 further comprising a brake caliper affixed to one of the chassis portions adjacent an outer peripheral portion of said brake rotor.

* * * * *